United States Patent
Schott

(10) Patent No.: US 6,691,844 B2
(45) Date of Patent: Feb. 17, 2004

(54) DRIVE ASSEMBLY, ESPECIALLY FOR AGRICULTURAL IMPLEMENTS

(75) Inventor: Wilhelm Schott, Cologne (DE)

(73) Assignee: GKN Walterscheid GmbH (DE)

( * ) Notice: Subject to any disclaimer, the term of this patent is extended or adjusted under 35 U.S.C. 154(b) by 0 days.

(21) Appl. No.: 10/241,292

(22) Filed: Sep. 11, 2002

(65) Prior Publication Data
US 2003/0049070 A1 Mar. 13, 2003

(30) Foreign Application Priority Data
Sep. 12, 2001 (DE) .......................... 101 45 012

(51) Int. Cl.$^7$ ................................................. F16D 9/00
(52) U.S. Cl. ...................... 192/22; 192/17 R; 192/56.5; 403/2; 464/33
(58) Field of Search ............... 192/56.5, 17 R, 192/22; 464/33; 403/2

(56) References Cited

U.S. PATENT DOCUMENTS

| | | | | |
|---|---|---|---|---|
| 2,038,896 A | * | 4/1936 | Fast ............................ | 192/56.5 |
| 3,220,218 A | * | 11/1965 | Rio et al. ..................... | 192/22 |
| 4,158,944 A | * | 6/1979 | Rabinow ..................... | 192/17 R |
| 4,244,456 A | | 1/1981 | Loker .......................... | 192/27 |
| 4,300,364 A | * | 11/1981 | van der Lely et al. ...... | 192/56.5 |
| 4,318,284 A | * | 3/1982 | van der Lely et al. ...... | 464/33 |
| 4,460,077 A | * | 7/1984 | Geisthoff ..................... | 192/56.5 |
| 4,629,044 A | * | 12/1986 | Post et al. ................... | 192/17 R |
| 4,758,109 A | | 7/1988 | Little et al. ................. | 403/2 |
| 5,076,407 A | | 12/1991 | Mikeska et al. .............. | 192/28 |
| 5,681,222 A | * | 10/1997 | Hansen et al. ............... | 464/160 |
| 5,807,179 A | * | 9/1998 | Hansen et al. ............... | 403/2 |

FOREIGN PATENT DOCUMENTS

| | | |
|---|---|---|
| DE | 27 56 809 | 6/1978 |
| DE | 29 05 363 | 8/1979 |
| DE | 30 34 606 A1 | 3/1982 |
| DE | 35 28 591 C2 | 10/1988 |
| DE | 33 44 043 C2 | 11/1992 |

* cited by examiner

Primary Examiner—Rodney H. Bonck
Assistant Examiner—Eric M. Williams
(74) Attorney, Agent, or Firm—Harness, Dickey & Pierce, P.L.C.

(57) ABSTRACT

A drive assembly, especially for agricultural implements with rotatingly driven masses, has a shear pin coupling (1) with a coupling hub (3) and a coupling sleeve (12) rotatable relative to the coupling hub (3). A ratchet gear (20) supported on the coupling hub (3) and rotatable relative to the coupling hub (3) and the coupling sleeve (12). All three components (3, 12, 20) are connected to one another by the head screw (26) constituting the shear pin. A ratchet (not illustrated) may engage a holding face of the ratchet gear (20). This results in the head screw (26) being sheared. As a result, the coupling sleeve (12) is disconnected from the coupling hub (3) in respect of drive.

12 Claims, 2 Drawing Sheets

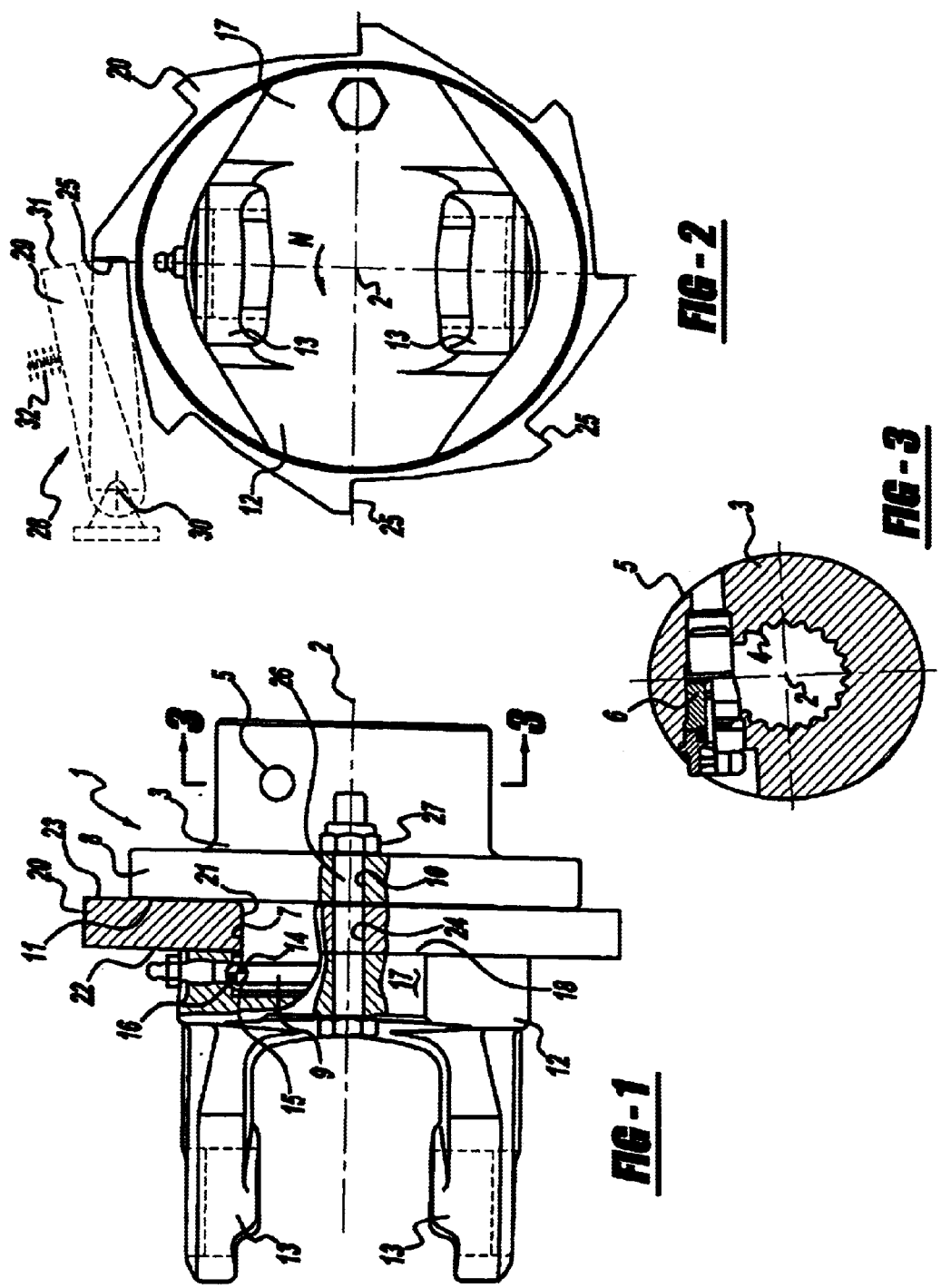

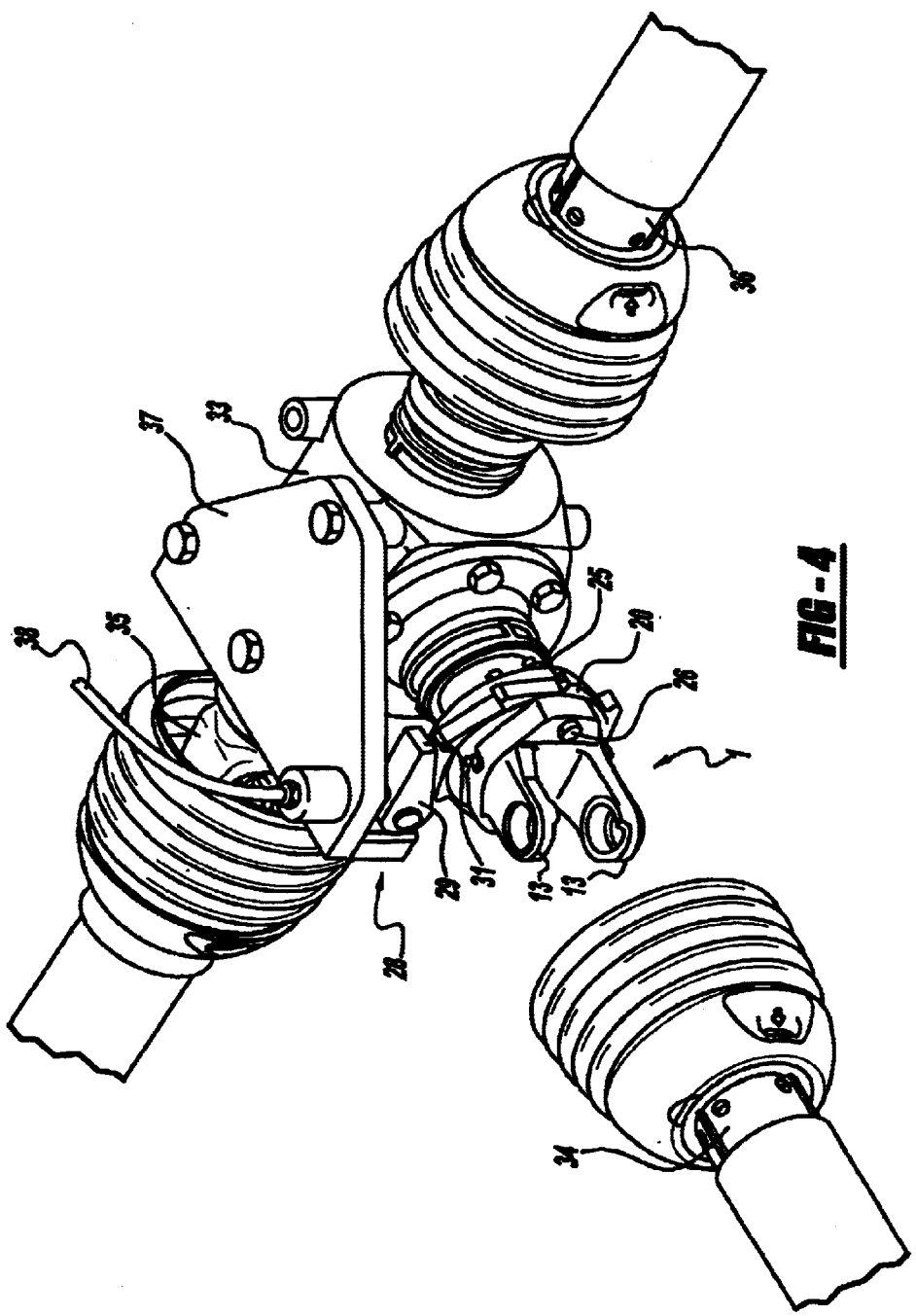

DRIVE ASSEMBLY, ESPECIALLY FOR AGRICULTURAL IMPLEMENTS

CROSS-REFERENCE TO RELATED APPLICATION

This application claims priority to German Patent Application No. 10145012.5 filed Sep. 12, 2001, which application is herein expressly incorporated by reference.

FIELD OF THE INVENTION

The invention relates to a drive assembly, and especially for agricultural implements with driven rotating masses.

BACKGROUND OF THE INVENTION

In the driveline of agricultural implements pulled by a tractor, driven by the tractor power take-off shaft or are in self-propelled agricultural implements, different functional parts of the implement are driven by a branched drive system that starts from a central drive. In order to avoid any overloading, the drive systems are provided with couplings.

In some functional areas where there is a risk of clogging, it is necessary to remove the material causing the clogging. In such a case, the operative either has to reverse the drive and if such an action does not release the obstruction, the operative must manually remove the clog while the machine is still in operation. Therefore, the drive first has to be stopped.

SUMMARY OF THE INVENTION

It is an object of the present invention to propose a drive assembly where the drive can be disconnected either manually or by an actuating device.

In accordance with the invention, a drive assembly has a shear pin coupling defining a longitudinal axis. A coupling hub is provided with a seat face and a bearing seat. A first projection with reference to the longitudinal axis projects radially from the seat face. A first attaching means is included. The seat face is axially arranged between the first projection and the bearing seat. A coupling sleeve is supported on the bearing seat of the coupling hub and is rotatable relative thereto. A second projection extends radially relative to the longitudinal axis. A second attaching means has a ratchet gear which is supported on the seat face of the coupling hub by a bearing bore to be rotatable relative thereto. At least one holding face is present. A shear pin is received in receiving bores of the first projection, second projection and ratchet gear. The bores are aligned relative to one another. The shear pin firmly connects the projections in the direction of rotation around the longitudinal axis. The receiving bores are arranged to be radially offset relative to the longitudinal axis. A locking device with a locking element is held in an inactive position. The locking device can be displaced manually, either directly or via an actuating device, out of the inactive position into contact with the holding face of the ratchet gear. This stops the rotational movement of the ratchet gear.

The solution in accordance with the invention provides a drive assembly that uses a shear pin coupling for disconnecting, by an outside external action, the drive from the functional part of the driven implement. This can be effected manually by a release cord or a lever arrangement. The locking element of the locking device is displaced from the inactive position into the active position to contact the holding face of the ratchet gear. The release cord may be a Bowden cable, for example, on the locking element. However, it is also possible to select a different actuating device which automatically releases a locking function, for example, when a cover in an agricultural implement is opened. The transmission of torque can deliberately be restored only by inserting a new shear pin. The measures in accordance with the invention make it possible to provide a prior art shear pin coupling additionally with a disconnecting function.

According to a further embodiment of the invention, the bearing seat of the coupling hub includes a first running groove which receives bearing balls. The coupling sleeve, via a second running groove, is rotatably supported around the longitudinal axis relative to the coupling hub. This ensures that the relative movement between the coupling hub and the coupling sleeve is of the low-friction type.

In a preferred embodiment, the holding face is formed by a projection provided on the circumference of the ratchet gear. Preferably, a plurality of holding faces are on the circumference of the ratchet gear in order to keep the reaction time as short as possible.

An advantageous embodiment includes the locking element as a locking ratchet held by a spring in the inactive position. The locking ratchet is pivoted against the force of the spring, so that, via a locking face, it comes into contact with the holding face. The locking ratchet is arranged such that the forces which are introduced into the locking ratchet, as a result of abruptly stopping of the ratchet gear, are directly introduced into the pivot bearing so that the locking ratchet cannot escape.

Instead of actuating the locking ratchet manually via a suitable lever drive, Bowden cable or by cable control, it can be actuated by a power drive. The power drive can be controlled by a sensor. When an operative places his hand into the region of the machine, the power drive records such an action as a releasing criterion. In a preferred embodiment, the shear pin is a headed screw with a nut. The shear pin connects the coupling sleeve, the coupling hub and the ratchet gear firmly to one another and is radially offset and arranged parallel relative to the longitudinal axis. Depending on the type of application, the first attaching mechanism is a profiled bore in the coupling hub. The bore is centred on the longitudinal axis. Also, the first attaching mechanism may be a flange connected to the coupling hub. The bore includes teeth to enable a connection with a corresponding profiled journal. Where the drive assembly is to be integrated into a driveshaft drive system, the second attaching mechanism is a joint yoke of a universal joint or a flange.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a partial section view of a shear pin coupling;

FIG. 2 is a side view according to FIG. 1 with a locking device associated with the shear pin coupling;

FIG. 3 is a section view along line III—III of FIG. 1; and

FIG. 4 is a perspective view of the inventive drive assembly associated with a transfer box of a drive system of an agricultural implement.

DETAILED DESCRIPTION OF THE PREFERRED EMBODIMENTS

The following description of the preferred embodiment(s) is merely exemplary in nature and is in no way intended to limit the invention, its application, or uses.

The drive assembly in accordance with the invention has a shear pin coupling 1 which defines a longitudinal axis 2 which also constitutes the axis of rotation of the shear pin coupling 1. The shear pin coupling 1 includes a coupling hub 3 with a bore 4 centred on the longitudinal axis 2. The bone includes teeth which are shown in FIG. 3. A transverse bore 5 intersects the bore 4. A tensioning element 6 is threaded into the transverse bore 5. The tensioning element 6 may fix the coupling hub 3 on the shaft of a transfer box. The shaft includes corresponding outer teeth.

The coupling hub 3 has a seat face 7. A first projection 8 radially projects from the seat face 7 and has a flange-like design. The seat face 7 ends in a first running groove 9, which constitutes a bearing seat. The first running groove 9 is an annular groove centred on the longitudinal axis 2. A first receiving bore 10 in the coupling hub 3 is radially offset relative to the longitudinal axis 2. The first receiving bore 10 extends parallel to the longitudinal axis and extends through the first projection 8.

The first projection 8 forms a first contact face 11 that extends towards the first running groove 9. The shear pin coupling 1 includes a coupling sleeve 12 which, in the present embodiment, embraces the joint yoke 13 with its two yoke arms. The joint yoke 13 constitutes part of a universal joint which, in turn, forms part of a driveshaft.

The coupling sleeve 12 has a bore 15. A second running groove 14, in the form of an annular groove, is arranged around the longitudinal axis 2. The coupling sleeve 12, by means of its bore 15, extends over the portion of the coupling sleeve 3 that contains the seat face 7. The first running groove 9 is positioned opposite the second running groove 14. The running grooves 9 and 14 together accommodate bearing balls 16. Thus, the coupling sleeve 12 and the coupling hub 3 are rotatable relative to one another.

The coupling sleeve 12 includes a second projection 17. The second projection 17 includes a second receiving bore 19. The arrangement of the second receiving bore 19 corresponds to the arrangement of the first receiving bore 10 relative to the longitudinal axis 2 in the first projection 8. The second receiving bore 19 extends parallel relative to the longitudinal axis 2. The second projection 17 and the coupling sleeve 12 form a second contact face 18 which extends towards the first projection 8 of the coupling hub 3.

The shear pin coupling 1 includes a ratchet gear 20. The ratchet gear includes a bearing bore 21 centered on the longitudinal axis 2. Additionally, the ratchet gear 20 has a first end face 22 and a second end face 23. The ratchet gear 20, via the bearing bore 21, is rotatably supported on the seat face 7 of the coupling hub 3. In the direction of the longitudinal axis 2, the ratchet gear 20 is held by its first end face 22 against the second contact face 18 and by its second end face 23 against the first contact face 11 of the coupling hub 3. The ratchet gear 20, on its circumference, includes plurality of projecting cams with holding faces 25. The holding faces 25 extend radially relative to the longitudinal axis 2.

A third receiving bore 24 is arranged at a radial distance from the longitudinal axis 2. The receiving bore 24 extends parallel relative to the longitudinal axis 2. The longitudinal axis of the receiving bore 24 is collinear to the first receiving bore 10 and the second receiving bore 19.

A shear pin, in the form of a head screw 26, is guided through the receiving bores 10, 19, 24. Additionally, the shear pin, by a nut 27, tensions the coupling hub 3, the ratchet gear 2 and the coupling sleeve 12. The head screw 26 is preferably received in a play-free way in the receiving bores 10, 19, 24. As a result, the coupling hub 3, the coupling sleeve 12 and the ratchet gear 20 are connected to one another in a rotationally fast way. Thus, when rotatingly driven by the joint yoke 13, the hub 3, sleeve 12 and gear 20 have to rotate together around the longitudinal axis 2.

The drive assembly in accordance with the invention, includes a locking device 28 in addition to comprising the above-described shear pin coupling 1. The locking device 28 is best seen in FIG. 2. The locking device 28 includes a locking element in the form of a locking ratchet 29. The locking ratchet 29 is arranged at a stationary bearing and is pivotable around the pivot axis 30. The locking ratchet 29 is held by a spring 32 in an inactive position. The locking face 31 is disengaged from the holding faces 25 of the ratchet gear 20. The ratchet gear 20 is pivoted around the pivot axis 30 by an actuating mechanism (not shown). The locking face 31 moves into the path of movement of the holding face 25 of the rotating ratchet gear 20 when the gear 20 is driven in the rotational direction N. Thus, the ratchet gear 20 is abruptly stopped. As a result, the head screw 26 shears at least one of the two shear faces formed in the region of contact between the ratchet gear 20 and the first projection 8 or the second projection 17. Thus, the transmission of torque is interrupted between the coupling hub 3 and the coupling sleeve 12 and, respectively, between the coupling sleeve 12 and the coupling hub 3.

FIG. 4 shows the drive assembly associated with a transfer box of a drive system for an agricultural implement. The transfer box has been given the reference number 33. It is attached to a machine frame (not shown), for example. The drive is effected via the driveshaft 34 and the shear pin coupling 1. The torque introduced into the transfer box 33 is distributed to the two output shafts 36, 38. In FIG. 4, the shear pin coupling 1 is disconnected from the driveshaft 34 in order not to obstruct the view of the shear pin coupling 1 and, in particular, of the locking device 28. The transfer box 33 is associated with a bracket 37 which pivotably supports the locking ratchet 29 of the locking device 28. FIG. 4 also shows how the locking ratchet 29, by its locking face 31, is associated with the holding face 25 of the ratchet gear 20. The head screw 26 acting as the shear pin can also be seen.

The actuating device 38 includes a setting element which directly acts on the locking ratchet 29 ends at the bracket 37. The setting element itself can be activated by a Bowden cable, an actuating lever or a release cord. Alternatively, the setting element may be an electrically, pneumatically or hydraulically operated power drive. The power drive is connected, by lines, to an actuating switch, an actuating valve or a sensor to release the actuating function.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A drive assembly for agricultural implements with rotatingly driven masses, comprising:

a shear pin coupling defining a longitudinal axis having a coupling hub with a seat face, and a bearing seat;

a first projection projects radially from the seat face with reference to the longitudinal axis and a first attaching mechanism, said seat face being axially arranged between the first projection and the bearing seat;

a coupling sleeve supported on said bearing seat of the coupling hub, said coupling sleeve rotatable relative to said coupling hub;

a second projection extending radially relative to the longitudinal axis;

a second attaching mechanism having a ratchet gear, said ratchet gear having a bearing bore, said ratchet gear supported on the seat face of the coupling hub and being rotatable relative to said coupling hub, and at least one holding face on said ratchet gear;

a shear pin received in receiving bores of the first projection, second projection and ratchet gear, said receiving bores aligned with one another and said shear pin firmly connecting said projections in the direction of rotation around the longitudinal axis, and said receiving bores arranged radially offset relative to the longitudinal axis;

a locking device having a locking element, said locking element held in an inactive position, said locking element being displaced manually, either directly or via an actuating device, out of said inactive position into contact with said holding face of the ratchet gear for stopping rotational movement of the ratchet gear.

2. A drive assembly according to claim 1, wherein the bearing seat of the coupling hub being formed by a first running groove, said first running groove receiving bearing balls, a second running groove on said coupling sleeve receiving said bearing balls, said coupling sleeve being supported around the longitudinal axis and being rotatable relative to the coupling hub.

3. A drive assembly according to claim 1, wherein the holding face is a projection on the circumference of the ratchet gear.

4. A drive assembly according to claim 3, wherein a plurality of holding faces being distributed on the circumference of the ratchet gear.

5. A drive assembly according to claim 1, wherein the locking element being a locking ratchet held by a spring in the inactive position and said locking ratchet pivotable against the force of the spring, so that a locking face comes into contact with the holding face.

6. A drive assembly according to claim 1, wherein the locking ratchet can be actuated by a power drive.

7. A drive assembly according to claim 6, wherein the power drive is controlled by a sensor.

8. A drive assembly according to claim 1, wherein the shear pin being a head screw with a nut.

9. A drive assembly according to claim 1, wherein the first attaching mechanism being a profiled bore in the coupling hub, said profiled bore centred on the longitudinal axis.

10. A drive assembly according to claim 1, wherein said second attaching mechanism being a joint yoke of a universal joint.

11. A drive assembly according to claim 1, wherein said first attaching mechanism being a flange.

12. A drive assembly according to claim 1, wherein said second attaching mechanism being a flange.

* * * * *